(12) United States Patent
Estabrooks

(10) Patent No.: US 7,454,497 B1
(45) Date of Patent: Nov. 18, 2008

(54) MULTI-PLATFORM AND MULTI-NATIONAL GATEWAY SERVICE LIBRARY

(75) Inventor: Scott D. Estabrooks, Middleton, MA (US)

(73) Assignee: Symantec Corporation, Cupertino, CA (US)

( * ) Notice: Subject to any disclaimer, the term of this patent is extended or adjusted under 35 U.S.C. 154(b) by 925 days.

(21) Appl. No.: 10/872,832

(22) Filed: Jun. 22, 2004

(51) Int. Cl.
G06F 15/16 (2006.01)
G06F 15/173 (2006.01)

(52) U.S. Cl. .............. 709/224; 709/203; 709/206; 709/225; 709/246

(58) Field of Classification Search .......... 709/203, 709/224, 225; 704/2, 3, 8; 707/3, 513
See application file for complete search history.

(56) References Cited

U.S. PATENT DOCUMENTS

| 7,194,506 | B1 * | 3/2007 | White et al. ............. 709/203 |
| 2001/0044809 | A1 * | 11/2001 | Parasnis et al. ............. 707/513 |
| 2003/0167197 | A1 * | 9/2003 | Shoemaker et al. ........... 705/10 |
| 2004/0015584 | A1 * | 1/2004 | Cartmell et al. ............. 709/224 |
| 2004/0030781 | A1 * | 2/2004 | Etesse et al. ................ 709/225 |
| 2004/0102956 | A1 * | 5/2004 | Levin ............................ 704/2 |
| 2004/0102957 | A1 * | 5/2004 | Levin ............................ 704/3 |
| 2004/0158471 | A1 * | 8/2004 | Davis et al. ................. 704/277 |
| 2005/0010391 | A1 * | 1/2005 | Chen et al. ..................... 704/8 |
| 2005/0044065 | A1 * | 2/2005 | McArdle ....................... 707/3 |

* cited by examiner

Primary Examiner—Quang N. Nguyen
(74) Attorney, Agent, or Firm—Finnegan, Henderson Farabow, Garrett & Dunner, L.L.P.

(57) ABSTRACT

The present invention discloses systems and methods for providing a multi-platform and multi-national gateway service library. A client may communicate with a gateway in its language character set by recognizing unique internal locale ID. The gateway may decode data transmitted by the client in order to access UTF-8 XML files stored on the gateway. In addition, the gateway may encode messages into a character set used by the client.

41 Claims, 6 Drawing Sheets

MULTI-PLATFORM AND MULTI-NATIONAL GATEWAY SERVICE LIBRARY

TECHNICAL FIELD

Systems and methods consistent with the present invention provide a multi-platform and multi-national gateway service library.

BACKGROUND

With the ever-increasing popularity of the Internet, particularly the World Wide Web ("Web") portion of the Internet, more and more computers across the globe are connected to networks, including Local Area Networks (LANs) and Wide Area Networks (WANs). Providing access to vast amounts of data, the Internet is typically accessed by users through Web "browsers" (e.g., Microsoft Internet Explorer® or Netscape Navigator@) or other "Internet applications" (e.g., iTunes from Apple Computer). Browsers and other Internet applications provide functionality to enable computers (often referred to as "clients") to communicate with applications such as web "servers" (e.g., Apache or Websphere) running on remote computers. In a typical client-server session, a browser provides a user located at a client with functionality to access a URL (Universal Resource Locator) or "Web" site stored on a server.

Communication over the Internet is conducted using certain protocols. These protocols allow users with different computers and different operating systems to communicate with each other over the Internet. Typically Internet protocols include the Transmission Control Protocol (TCP) and the Internet Protocol (IP).

The explosive growth of the Internet has had a dramatic effect on how people communicate and engage in many business opportunities. More and more, people require access to the Internet to facilitate research, competitive analysis, communication between branch offices, and send e-mail, to name just a few. Typically, a gateway mediates data between different computers connected to a network.

Due to the global reach of the Internet, a client logging onto a gateway may in fact be located in a different region of the world or a different country than the server the client is requesting to access. Consequentially, the user may transmit data to a gateway that is written in a character set that may be different from the character set recognized by the firewall. To handle such a situation, gateways have restricted the functionality that is made available to a user. For example, certain commands may not be available to users in certain locations or a user may be required to transmit data that is formatted in a specified language.

However, more complicated scenarios may arise. For example, if an e-mail address is encountered by a gateway, the sender of the e-mail address can be determined by looking for the "@" symbol used to separate a username from a host name, such as an e-mail address in the format of username@host.com. Part of the e-mail address, such as the host name, may be written in English, but the username may not be written in English. Further, protocol commands such as "getfile" are passed to a gateway in English, but the file name may be in a different language. To understand data that is transmitted in a different language from that used by a gateway or a client, there is a need to enhance functionality of the gateway with the capability to decipher data that is passed to it in any character set.

SUMMARY

Consistent with the principles of the present invention, a method is provided for facilitating communication among clients in a network using languages native to each client. The method includes intercepting, by a gateway in the network, a message including information identifying a location associated with a client identified by the message. The method also includes determining from the location information a language native to the client. At least a portion of the message is converted if necessary to the language native to the client. The message, including any converted portion replacing a corresponding portion in the intercepted message, is forwarded from the gateway to a recipient.

Consistent with the present invention, a system is provided for facilitating communication among clients in a network using languages native to each client. The system includes a processor and a memory. The memory stores instructions for intercepting a message including information identifying a location associated with a client identified by the message, determining from the location information a language native to the client, converting at least a portion of the message if necessary to the language native to the client, and forwarding the message, including any converted portion replacing a corresponding portion in the intercepted message, to a recipient.

Consistent with the principles of the present invention, a method is provided for communicating between a gateway and a client in a character set native to the client. The method includes a determination of a location of the client by receiving data from the client, the data including an identifier of the location of the client, accessing a library based on the identifier, and a conversion of the data into UTF-8 using the library.

In another embodiment consistent with the principles of the present invention, a method is provided for communicating between a gateway and a client in a character set native to the client. The method includes receiving data from the client, the data including an identifier of the location of the client, retrieval of data from the gateway from a library based on the identifier, and conversion of the retrieved data a character set recognizable by the client.

In another embodiment consistent with the principles of the present invention, a method is provided for communicating in a character set used by a client computer. The method includes receiving data at a gateway encoded in a first character set, accessing a library for a second character set based on an identifier derived from the data, and conversion of the data to the second character set.

Consistent with another embodiment, an apparatus is provided for communicating between a gateway and a client in a character set used by the client. The apparatus includes a processor, an identification module that identifies location of the client by receiving data from the client, the data including an identifier of the location of the client, an accessing module that accesses a library based on the identifier, and a conversion module that converts the data into UTF-8 using the library.

In yet another embodiment consistent with the present invention, a method is provided for communicating between a gateway and a client in a common character set. The method includes receiving a request, the request reflecting an identifier of the originator of the request, using the identifier to determine a language corresponding to the location of the originator, and generating a response based upon the determined language.

BRIEF DESCRIPTION OF THE DRAWINGS

Both the foregoing general description and the following detailed description are exemplary and explanatory only. They do not restrict the invention, as claimed. Furthermore, the accompanying drawings, which are incorporated in and constitute a part of this specification, illustrate embodiments of the invention and together with the description, serve to explain the principles of the invention. In the drawings:

DETAILED DESCRIPTION

Systems and methods consistent with the present invention provide a multi-platform and multi-national gateway service library. The gateway service library includes programs providing a mechanism for the gateway code to function in a multi-national and multi-platform environment from a single code base operating in a single location. The gateway may be located in one country and interact with clients located in another country. In particular, the gateway service library facilitates interaction between the gateway and a client that is located in a foreign country by providing a means to recognize data from the client that is encoded in a character set not native to the one used by the gateway.

There are various types of functions that a gateway may encounter when operating in a multi-national environment. A gateway must be able to handle different character sets and character strings, for example. A character set is made up of characters that represent all available symbols, letters, and numerals. Character strings are a series of characters that are manipulated as a group. First, the gateway may handle hard coded character strings that it transmits. Second, the gateway may parse mixed character set strings that are transmitted to it. And third, the gateway routines may convert character sets to and from UTF-8.

UTF-8 is a manner of encoding a character using a universal character set that is easier to manipulate by any computer. In particular, UTF-8 encodes a-variation of the Unicode character set. The Unicode character set provides a unique mapping for virtually every character used by a computer by assigning every character an integer number. However, a particular client may not be configured to receive input in UTF-8 encoded Unicode. For example, an older Windows based platform operating in a different character set will not be able to receive such input.

Systems and methods consistent with the present invention enable a gateway to function in a multi-national environment using UTF-8 encoded Unicode. Such functionality is provided through the use of a unique internal locale ID that is transmitted to the gateway and derived from data sent by a client. The unique internal locale ID identifies the location of the client accessing the gateway and thus the character set native to the client.

To facilitate interaction with a client, the gateway stores hard coded strings, such as prompts, responses, and error details, in UTF-8 encoded XML files. XML, which is short for extensible markup language, is a specification designed for web documents that allows users to create their own customized tags to facilitate the definition, transmission, validation, and interpretation of data between applications.

Consistent with the present invention, XML files may be located in different directories, one for each supported language. For example, there may be a directory of UTF-8 encoded XML files for English, German, Chinese, Japanese, etc. The different directories can then be accessed to provide a client with a prompt, response, or error message expressed in a character set native to the client. The unique internal locale ID corresponding to the client is used to determine the correct file directory to access. Because each string request transmitted to the gateway is identified with a unique internal locale ID, it is possible to easily change from one language to another even within the same session.

In addition, when a client sends a piece of data, such as a username using a foreign character set, the gateway encodes the username into UTF-8 by calling a program module that converts the foreign character set to UTF-8. Once the username has been converted, a program module can then search for the username in an authentication list.

Therefore, to facilitate communication among clients in a network using languages native to each client, a gateway in the network may intercept a message including information identifying a location associated with a client identified by the message. The message may include information identifying the location of the user if, for example, the user is prompted to specify a language. For other protocols, such as HTTP (hypertext transfer protocol) and SMTP (simple mail transfer protocol), the language being used by the user may be determined by examining a protocol header transmitted with a message. Based upon the location information, a language and a character set native to the client may be determined. At least a portion of the message may be converted if necessary to the language and the character set native to the client and the message may be forwarded, including any converted portion replacing a corresponding portion in the intercepted message, from the gateway to a recipient.

Reference will now be made in detail to the present embodiment of the invention, an example of which is illustrated in the accompanying drawings. Wherever possible, the same reference numbers will be used throughout the drawings to refer to the same or like parts.

System Configuration

Figure 1:
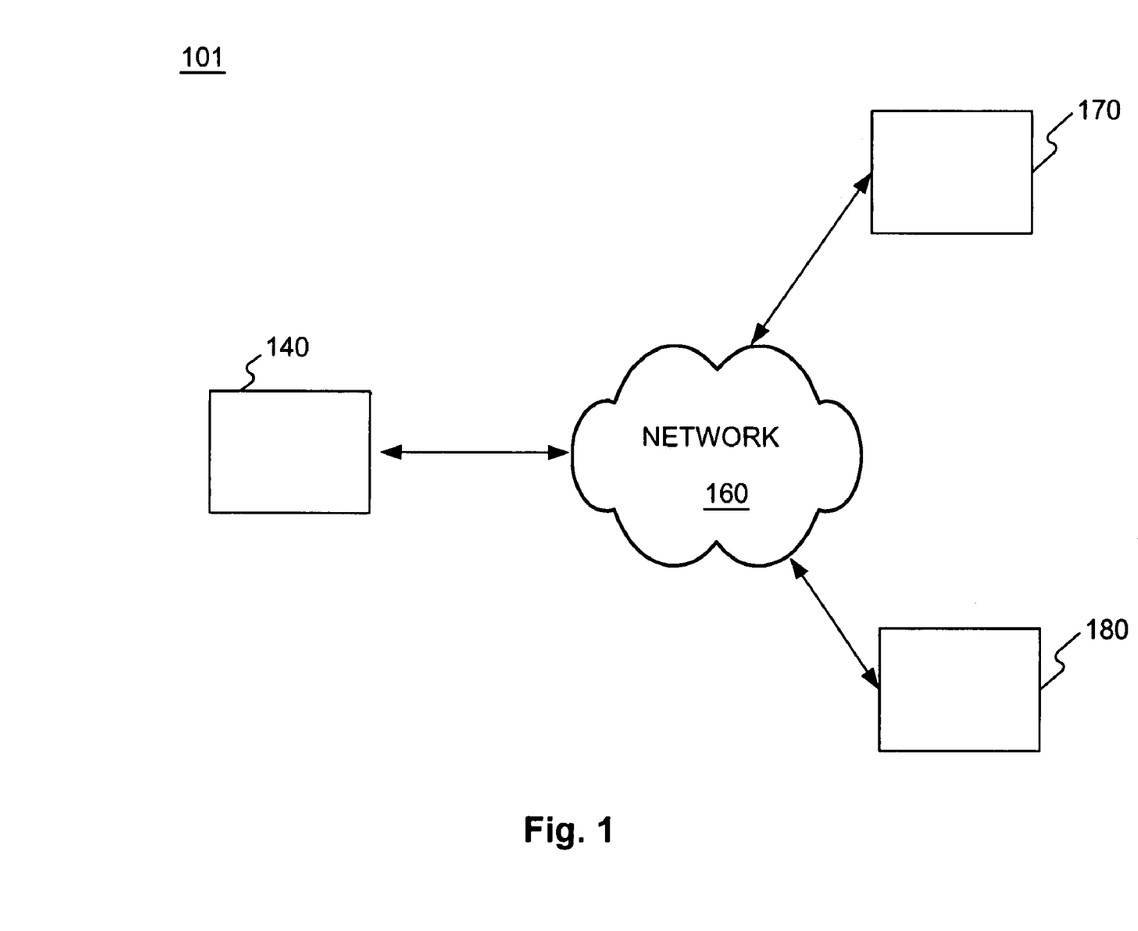
FIG. 1 is an exemplary diagram of a system in which a multi-platform and multi-national gateway service library may be implemented in a manner consistent with the present invention.

FIG. 1 is an exemplary diagram of a system 101 in which a multi-platform and multi-national gateway service library consistent with the present invention may be implemented. System 101 includes a gateway 140 connected to a network 160, and a client 170 and a server 180. Network 160 may be the Internet and gateway 140 may connect to network 160 using a Transport Control Protocol (TCP) connection.

Furthermore, network 160 may be connected to multiple devices, in this case, client 170 and server 180. Client 170 and server 170 may be servers, personal computers, or other types of data processing systems, and may receive and transmit data over a communications port (not shown). Client 170 and server 180 may receive data over network 160 and may each include a network access card or the like (not shown). Using a TCP connection, network 160 may transmit data between client 170 and/or server 180 via gateway 140. In addition, client 170 may transmit data to gateway 140, which is then scanned or modified in some manner by gateway 140, after which gateway 140 transmits the scanned or modified data to server 180. Those skilled in the art will recognize that gateway 140 may be connected to other computers via a network (not shown) and thereby act as a gateway to network 160 and computers connected to network 160. In addition, gateway 140 may be located in one country, while client 170 may be located in a different country. Accordingly, a user may use client 170 to communicate with gateway 140 by transmitting data over network 160.

Figure 2:
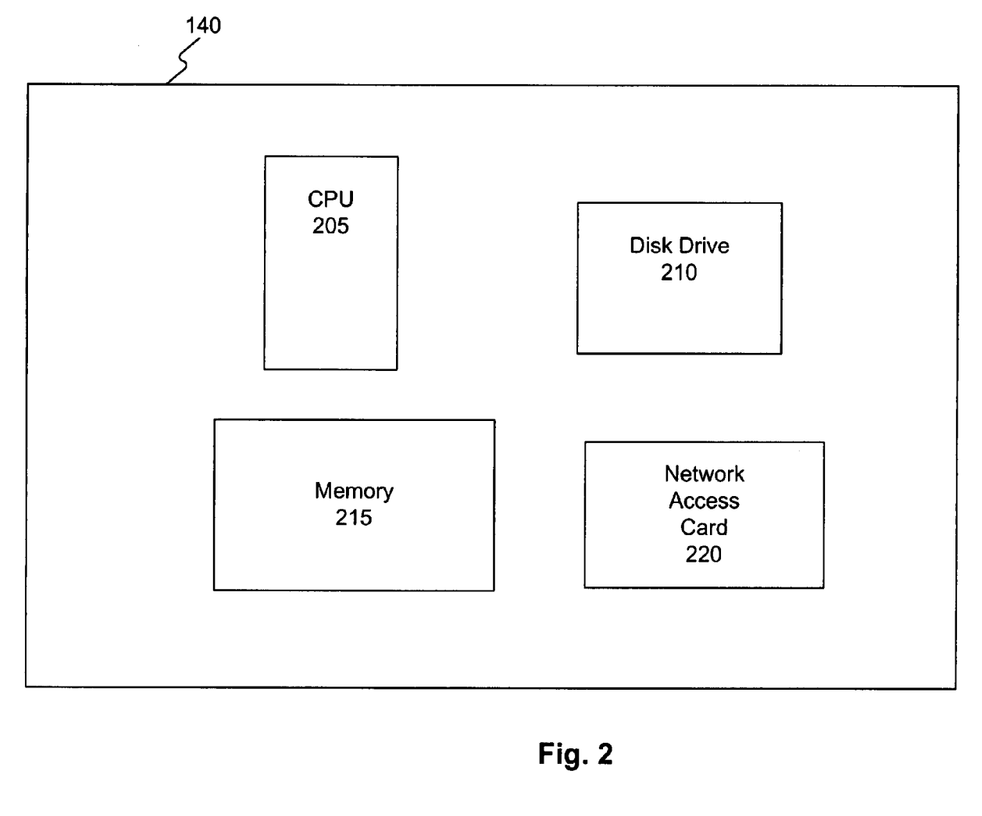
FIG. 2 is an exemplary diagram of components of a gateway consistent with the principles of the present invention.

FIG. 2 is a diagram of components of gateway 140 consistent with the principles of the present invention. Gateway 140 includes central processing unit (CPU) 205, disk drive 210, memory 215, and network access card 220. CPU 205 may be any processor or processors for executing program instructions. Memory 215 may be RAM or another permanent, semi-permanent, or temporary storage device, including ROM and flash memory. Disk drive 210 may be a hard disk drive, optical drive, or other type of mass, persistent storage device. Network access card 220 may be a modem, cable modem, Ethernet card, T1 line connector, or some other access card for connecting gateway 140 to network 160 for communication.

Software loaded into memory 215 from, for example, disk drive 210 at the direction of CPU 105 may be used to implement a firewall for protecting client 170 against unauthorized access. One of skill in the art will recognize that a firewall may also be implemented in routers and other network architecture components. The firewall may consist of a set of programs that regulate the flow of traffic into and out of a network connected to, for example, client 170 as shown in FIG. 1. The set of programs may include rules that represent a security policy for the firewall.

Figure 3:
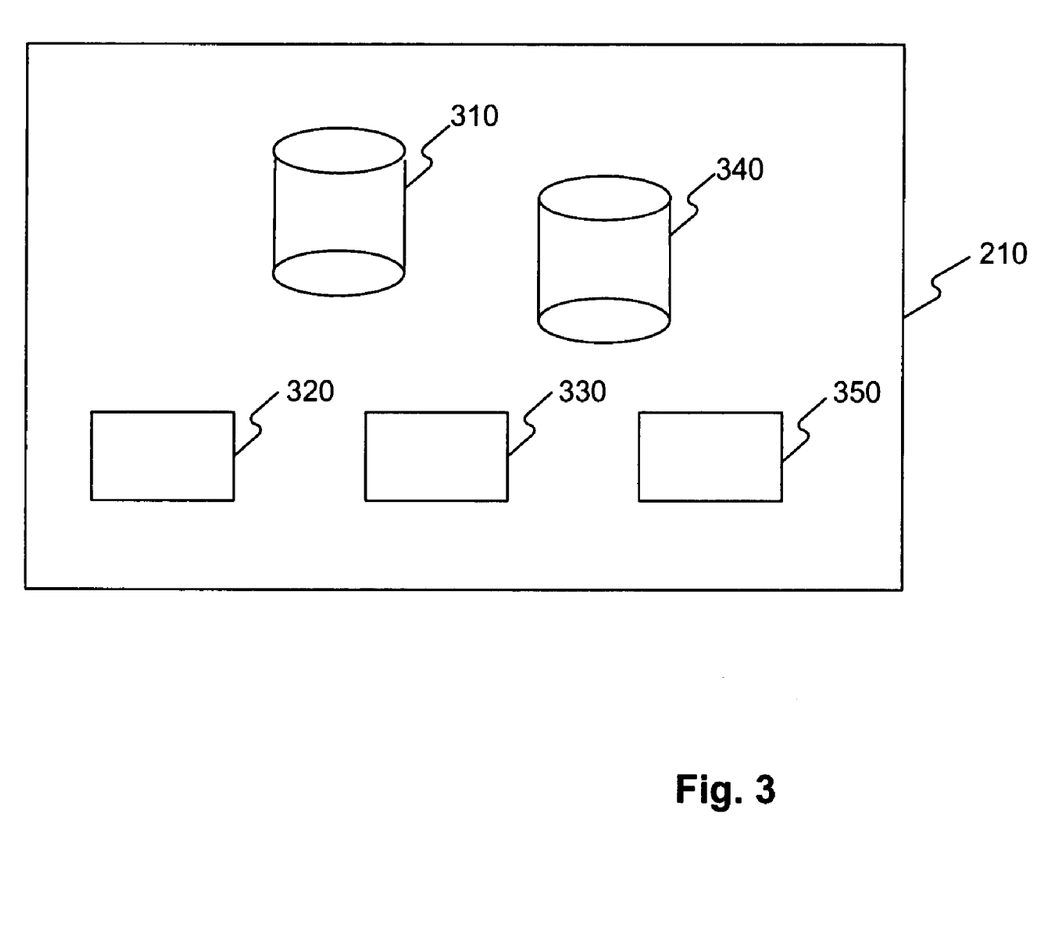
FIG. 3 is an exemplary diagram of data stored in a disk drive residing in a gateway consistent with the present invention.

FIG. 3 is a diagram of data stored in disk drive 210 consistent with the present invention. Configuration data 310 used by gateway 140, such as timeouts, authentication usernames, and rules are stored in UTF-8 XML files in disk drive 210. Configuration data 310 may be organized into directories based on supported languages, with a separate directory and/or subdirectories used for each supported language. Because client 170 and server 180 may use character sets that may or may not be encoded in UTF-8, gateway 140 may accept the non-UTF-8 encoding and, when necessary, parse and encode the bits into UTF-8 so that the incoming data can be compared to configuration data 310 stored in disk drive 210 of gateway 140.

A response may be sent to client 170, for example, from gateway 140 by encoding a message into the character set native to client 170. For example, if the username supplied by client 170 does not match the name stored in gateway 140, then a response, such as an error message, may be sent back to client 170. These responses are stored as UTF-8 XML files included in configuration data 310. If client 170 is not using UTF-8 encoding, the message is decoded into a character set used by the client before transmission by examining an appropriate file stored in configuration data 310.

The programs stored in gateway 140 use a unique internal locale ID to identify a locale of a client, such as client 170, attempting to access gateway 140. The unique internal locale ID is derived from the data that is transmitted by client 170 and may imply the byte size of a character for a requested string, for example. Using the unique internal locale ID, gateway 140 may execute a parsing module 320. Parsing routine module 320 performs a conversion to and from UTF-8 and may identify the size of a particular string and its format. Modules are program instructions for performing a particular task. For example, conversion module 330 may convert data to and from Unicode and UTF-8. Conversion module 330 executes as needed to convert data transmitted by client 170. For example, in some situations, data is converted into UTF-8 so that the converted data can then be compared with configuration data 310 stored in gateway 140. In other situations, data stored on gateway 140 is converted from UTF-8 into the character set used by client 170.

A gateway service library may include header file 340 that contains a list of the locale strings used on Windows, Solaris, Linux, and Java machines that map to a unique internal locale ID. The unique internal locale ID may thus be used to identify the character set of a client's computer. Header file 340 may be stored on gateway 140, for example. When data is transmitted to gateway 140 from client 170, header file 340 may be used to determine the character set of client 170. For example, when client 170 transmits data to gateway 140, the data is used to derive a unique internal locale ID corresponding to client 170. To determine the character set of client 170, gateway 140 can inspect the unique internal locale ID transmitted by client 170. Authentication module 350 may access configuration data 310 to validate usernames and passwords transmitted by client 170.

System Operation

Figure 4:
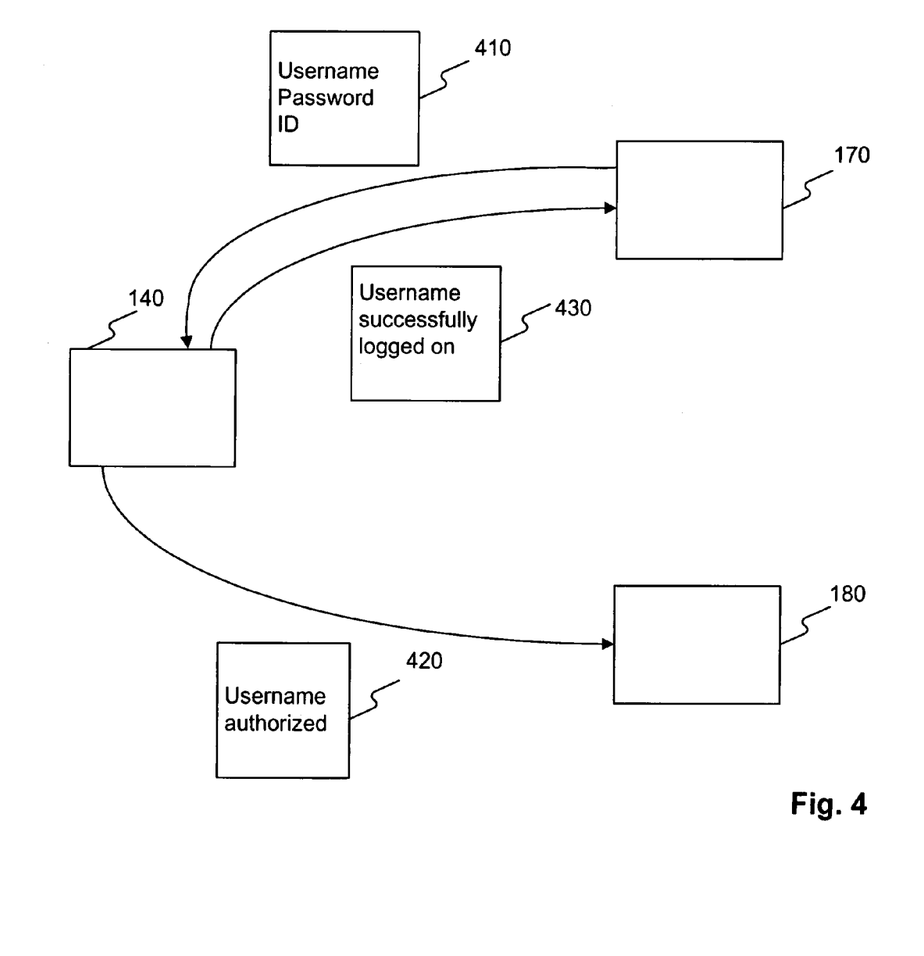
FIG. 4 is an exemplary diagram illustrating the flow of data between a client and a gateway consistent with the present invention.

FIG. 4 is a flow diagram illustrating a data exchange between a client, a server, and a gateway implementing a multi-platform and multi-national gateway service library consistent with the present invention. In the following example, generally described, client 170 attempts to access server 180. Client 170 transmits a username and password, as indicated by data 410, to gateway 140. Data 410 also includes the unique internal locale ID for client 170. Data 410 may include the unique internal locale ID because, if the protocol being used by client 170 allows, gateway 140 may prompt client 170 for the character set it is using, which corresponds to a unique internal locale ID. Alternatively, the unique internal locale ID may already be included in the protocol used by client 170. Data 140 may also include the unique internal locale ID if a character set is assigned on a per user basis.

Gateway 140 may use the unique internal locale ID to determine a language native to client 170. After making such a determination, gateway 140 may also convert the username and password supplied by client 170, as needed, into UTF-8 using conversation module 330. Gateway 140 may then check configuration data 310, for example, to determine whether the user is authorized.

After determining that the user is authorized to access data, gateway 140 may send data 420, for example, to server 180. Data 420 may provide a message indicating that client 170 is confirmed as an authorized user and may access data stored on server 180.

Gateway 140 may also send a message back to client 170 in the language native to client 170. For example, gateway 140 may determine an appropriate message that may be retrieved from configuration data 310. Data 430 includes a message that may be transmitted to client 170 to indicate that the user has successfully logged on and gained access.

Figure 5:
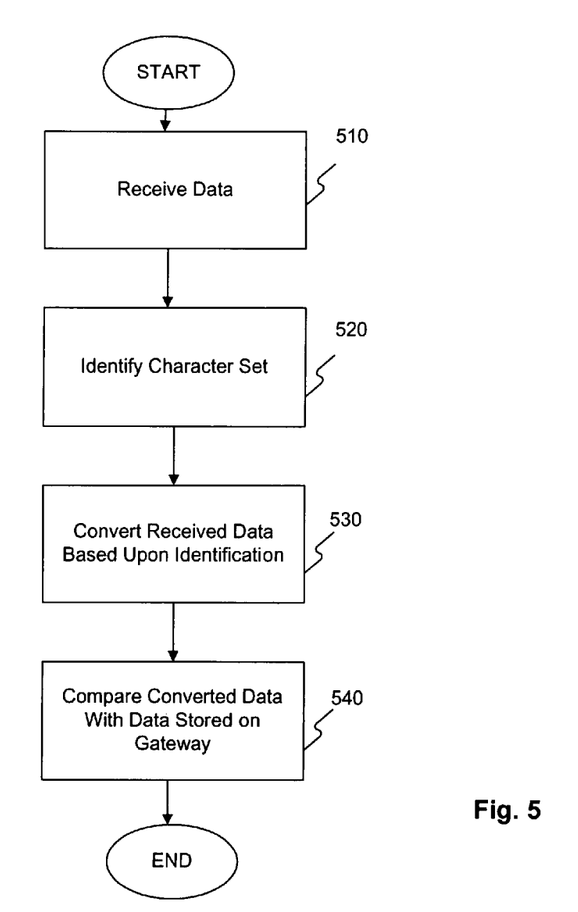
FIG. 5 is a flow diagram of a process for providing a multi-platform and multi-national gateway service library consistent with the present invention.

FIG. 5 is a flow diagram of a process for converting data transmitted by server 180 in a first character set into a second character set that is implemented by gateway 140. The following example is described in connection with client 170 submitting a password for authentication by gateway 140. For the purposes of this example, suppose client 170 is using a Shifted Japanese character set and sends a username written in Japanese to authenticate itself as an authorized user. Gateway 140 may encode the username into UTF-8 using conversion module 330 prior to checking for the username in an authentication library stored in configuration data 310.

Client 170 is initialized in a particular language. At the start of the process, gateway 140 receives a TCP/IP request from client 170 to connect with server 180 (step 510). The request, in the form of a string, includes a unique internal locale ID. The request also includes a submission of the user's credentials, such as a username and password. Parsing module 320 may inspect the string to determine which portions of the string correspond to the unique internal locale ID, the username, and the password. For example, the username may be determined in parsing module 320 by searching for an "@" symbol separating a username and a domain name. The authentication of the username supplied by server 180 is then performed by gateway 140.

To authenticate the username, gateway 140 uses the unique internal locale ID to determine the character set being used by client 170 (step 520). The unique internal locale ID returned from client 170 may also be used to perform any of the multi-national functions that are needed when processing data from client 170. The unique internal locale ID may be compared with data stored in header file 340, which includes data tables for matching a country or region with unique internal locale IDs.

Gateway 140 will then identify the character set being used by client 170 (step 530). Character sets are often stored as codepages. A codepage specifies a corresponding relationship between unique identifiers that are used to express every character that is included in a particular character set. For example, a character set may include an alphabet, punctuation, numbers, and other special characters. Accordingly, the character set for Shifted Japanese may be retrieved based upon identifying the unique internal locale ID and retrieving an XML file may from a directory found in configuration data 310 storing a codepage for this particular character set.

Conversion module 330 will then convert the received username into UTF-8 using the retrieved codepage (step 540). Next, authentication module 350 will search for the UTF-8 encoded username in configuration data 310 to determine whether a match exists. Accordingly, the gateway receives data from a client and examines the data to determine the character set that the data is expressed in. Once the character set is identified, the gateway converts the data into UTF-8 and may compare the converted data with data stored on the gateway in UTF-8. An authorization message may also be sent to the server, deeming the client authorized to access the server.

Figure 6:
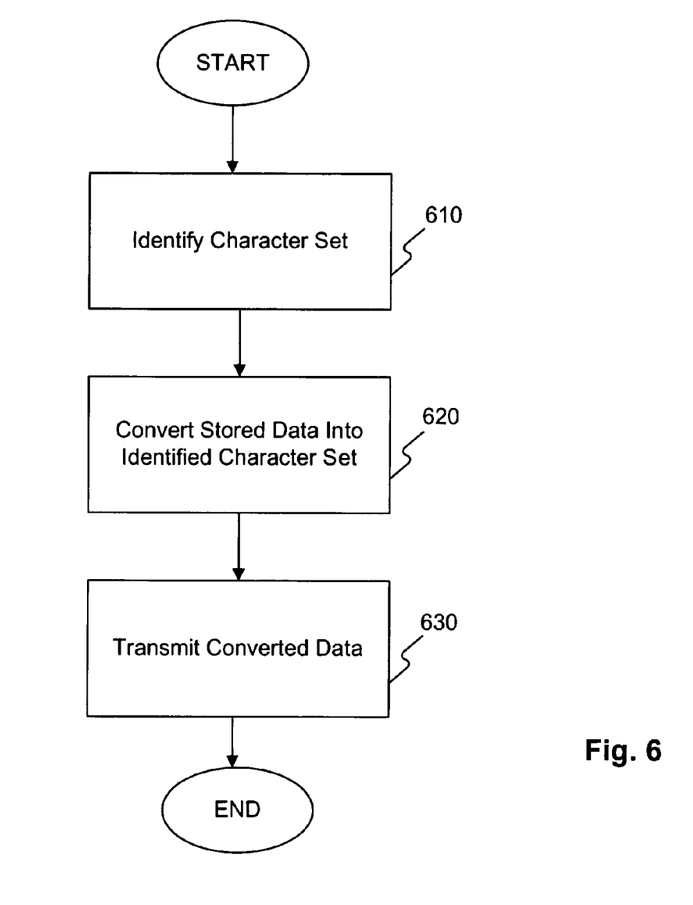
FIG. 6 is another flow diagram of a process for providing a multi-platform and multi-national gateway service library consistent with the present invention.

FIG. 6 is a flow diagram of a process for encoding data stored on gateway 140 into a character set native to client 170. Continuing with the example discussed above, suppose that the username is correct and a message should be transmitted to client 170 to indicate that the supplied username was authorized and may access data stored on server 180. Gateway 140 may transmit a message indicating that the user has successfully logged in by including the username, as written in Japanese, in the message. The text portion specifying that "User has successfully logged in" may be obtained from an appropriate XML file expressed in Japanese UTF-8, but the username may come from the client who was using the Shifted Japanese character set.

Gateway 140 determines the character set being used by client 170 by examining the unique internal ID (step 610). After determining the character set being used by client 170, the gateway will send a message saying that the user has successfully logged on. The message is retrieved from configuration data 310 stored on gateway 140 for the language used by client 170 (step 620).

In this example, the language is Shifted Japanese. The message "successfully logged on," is then converted from UTF-8 into Shifted Japanese by conversion module 330 using an appropriate codepage retrieved from configuration data 310. Accordingly, by passing the name into conversion module 330 with a language set to Shifted Japanese, the resultant string would be returned written in Shifted Japanese (step 630).

When the message is transmitted, the "Username" supplied by client 170 may be appended to the front of the message as it is already expressed in the proper character set. The message may then be transmitted to client 170 (step 640).

Accordingly, as discussed above, a gateway determines a unique internal locale ID used by a client. The gateway may then retrieve and transmit to the client data from an appropriate directory in the character set used by the client.

In accordance with the present invention, a client may communicate with a gateway in its language character set. The gateway may decode protocol data transmitted by the client in order to inspect the details of the protocol request. In addition, the gateway may encode messages stored in UTF-8 XML files stored on the gateway into a language character set native to the client.

One of skill in the art will recognize that the functionality provided by gateway 140 may reside on a client, server, or personal computer. The use of a separate gateway is not required of the present invention. In addition, in the event that a user in a particular location does not want to communicate in the language spoken in that location, the user may override the unique internal locale ID and may specify a language. For example, a person visiting one country may want to communicate and receive messages in his or her native language. Using an appropriate graphical user interface (GUI), the user of a firewall according to the present invention may select an override option to specify the language in which the user would like to communicate and receive messages. Alternatively, the user may not be required to specify a unique internal locale ID. Instead, the user may set up a client as desired. When the language being used by a particular user of the client differs from that of the firewall, an administrator may configure the user to use an alternate language when communicating with the firewall. Accordingly, the client user will communicate using his character set and the firewall will respond in the user's character set.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method for facilitating communication among clients in a network using languages native to each client, the method comprising:
   intercepting, by a gateway in the network, a message including information identifying a location associated with a client identified by the message;
   determining from the location information a language native to the client;
   converting at least a portion of the message to the language native to the client;
   searching data stored by the gateway for the converted portion of the message;
   identifying a response based on whether the converted portion of the message is found in the data stored by the gateway; and
   forwarding the response from the gateway to a recipient.

2. The method of claim 1, wherein the recipient is identified in the message.

3. The method of claim 1, wherein the recipient is identified as the client in the message.

4. The method of claim 1, wherein the recipient is identified in the message as an individual other than the client.

5. The method of claim 1, wherein the message comprises a username and a password.

6. The method of claim 5, wherein the response indicates that a user who submitted the username and password is authorized.

7. The method of claim 5, wherein the response indicates that a user who submitted the username and password is not authorized.

8. The method of claim 1, wherein when the data stored by the gateway includes the converted portion of the message, the response indicates that a user associated with the message is authorized.

9. A system for facilitating communication among clients in a network using languages native to each client, the system comprising:
   a processor; and
   a memory, the memory storing instructions for:
      intercepting, by a gateway in the network, a message including information identifying a location associated with a client identified by the message,
      determining from the location information a language native to the client,
      converting at least a portion of the message to the language native to the client,
      searching data stored by the gateway for the converted portion of the message,
      identifying a response based on whether the converted portion of the message is found in the data stored by the gateway, and
      forwarding the response to a recipient.

10. The system of claim 9, wherein the recipient is identified in the message.

11. The system of claim 9, wherein the recipient is identified as the client in the message.

12. The system of claim 9, wherein the recipient is identified in the message as an individual other than the client.

13. The system of claim 9, wherein the message comprises a username and a password.

14. The system of claim 13, wherein the response indicates that a user who submitted the username and password is authorized.

15. The system of claim 13, wherein the response indicates that a user who submitted the username and password is not authorized.

16. The system of claim 9, wherein when the data stored by the gateway includes the converted portion of the message, the response indicates that a user associated with the message is authorized.

17. A system for facilitating communication among clients in a network using languages native to each client, the system comprising:
   a processor for executing computer program instructions;
   means for storing instructions for intercepting, by a gateway in the network, a message including information identifying a location associated with a client identified by the message;
   means for determining from the location information a language native to the client;
   means for converting at least a portion of the message to the language native to the client;
   means for searching data stored by the gateway for the converted portion of the message;
   means for retrieving a response based on whether the converted portion of the message is found in the data stored by the gateway; and
   means for forwarding the response to a recipient.

18. The system of claim 17, wherein the recipient is identified in the message.

19. The system of claim 17, wherein the recipient is identified as the client in the message.

20. The system of claim 17, wherein the recipient is identified in the message as an individual other than the client.

21. A method for communicating between a gateway and a client in a character set native to the client, the method comprising:
   receiving, by the gateway, a message from the client;
   determining a location of the client based on the message, the message including an identifier of the location of the client;
   identifying the character set native to the client based on the identifier;
   converting at least a portion of the message into UTF-8 using the character set;
   searching data stored by the gateway for the converted portion of the message; and
   sending a response to a recipient based on whether the converted portion of the message is found in the data stored by the gateway.

22. The method of claim 21, wherein the message comprises a string and the gateway parses the string to obtain the identifier.

23. The method of claim 21, wherein the identifier is compared with data in a header file stored by the gateway.

24. The method of claim 23, wherein the header file includes data tables for matching a country or region with the identifier.

25. The method of claim 21, wherein the message comprises a username and a password.

26. The method of claim 25, wherein the response indicates that a user who submitted the username and password is authorized.

27. The method of claim 25, wherein the response indicates that a user who submitted the username and password is not authorized.

28. The method of claim 21, wherein the character set is stored as a codepage comprising conversion relationships for the character set.

29. A system for communicating between a gateway and a client in a character set native to the client, the system comprising:

a processor; and a memory, the memory storing instructions for:

receiving, by the gateway, a message from the client, determining a location of the client based on the message, the message including an identifier of the location of the client, identifying the character set native to the client based on the identifier, converting at least a portion of the message into UTF-8 using the character set, searching data stored by the gateway for the converted portion of the message, and sending a response to a recipient based on whether the converted portion of the message is found in the data stored by the gateway.

30. The system of claim 29, wherein the message comprises a string and the gateway parses the string to obtain the identifier.

31. The system of claim 29, wherein the identifier is compared with data in a header file stored by the gateway.

32. The system of claim 31, wherein the header file includes data tables for matching a country or region with the identifier.

33. The method of claim 29, wherein the message comprises a username and a password.

34. The method of claim 33, wherein the response indicates that a user who submitted the username and password is authorized.

35. The method of claim 33, wherein the response indicates that a user who submitted the username and password is not authorized.

36. The system of claim 29, wherein the character set is stored as a codepage comprising conversion relationships for the character set.

37. A system for communicating between a gateway and a client in a character set native to the client, the system comprising:

a processor for executing computer program instructions;

means for receiving, by the gateway, a message from the client;

means for determining a location of the client based on the message, the message including an identifier of the location of the client;

means for identifying the character set native to the client based on the identifier;

means for converting at least a portion of the message into UTF-8 using the character set;

means for searching data stored by the gateway for the converted portion of the message; and means for sending a response to a recipient based on whether the converted portion of the message is found in the data stored by the gateway.

38. The system of claim 37, wherein the message comprises a string and the gateway parses the string to obtain the identifier.

39. The system of claim 37, wherein the identifier is compared with data in a header file stored by the gateway.

40. A computer-readable storage medium containing computer program instructions stored thereon, the computer program instructions executable by a processor to perform a method for facilitating communication among clients in a network using languages native to each client, the method comprising the steps of:

intercepting, by a gateway in the network, a message including information identifying a location associated with a client identified by the message;

determining from the location information a language native to the client;

converting at least a portion of the message to the language native to the client;

searching data stored by the gateway for the converted portion of the message;

identifying a response based on whether the converted portion of the message is found in the data stored by the gateway; and forwarding the response from the gateway to a recipient.

41. A computer-readable storage medium containing computer program instructions stored thereon, the computer program instructions executable by a processor to perform a method for communicating between a gateway and a client in a character set native to the client, the method comprising the steps of:

receiving, by the gateway, a message from the client;

determining a location of the client based on the message, the message including an identifier of the location of the client;

identifying the character set native to the client based on the identifier;

converting at least a portion of the message into UTF-8 using the character set;

searching data stored by the gateway for the converted portion of the message; and sending a response to a recipient based on whether the converted portion of the message is found in the data stored by the gateway.

* * * * *